United States Patent
Kim et al.

(10) Patent No.: US 12,332,404 B1
(45) Date of Patent: Jun. 17, 2025

(54) DEVICE FOR MEASURING AN AMOUNT OF SNOWFALL IN CONSIDERATION OF A WEIGHT OF SNOWFALL

(71) Applicant: NATIONAL INSTITUTE OF METEOROLOGICAL SCIENCES, Seogwipo-si (KR)

(72) Inventors: Yu Jeong Kim, Seogwipo-si (KR); Mi Eun Park, Seogwipo-si (KR)

(73) Assignee: NATIONAL INSTITUTE OF METEOROLOGICAL SCIENCES, Seogwipo-si (KR)

(*) Notice: Subject to any disclaimer, the term of this patent is extended or adjusted under 35 U.S.C. 154(b) by 0 days.

(21) Appl. No.: 19/091,695

(22) Filed: Mar. 26, 2025

(30) Foreign Application Priority Data

Mar. 29, 2024 (KR) .................... 10-2024-0043184

(51) Int. Cl.
*G01W 1/14* (2006.01)
(52) U.S. Cl.
CPC .................... *G01W 1/14* (2013.01)
(58) Field of Classification Search
CPC .......... G01W 1/14; G01W 1/10; G01W 1/06; G01G 5/00; G06T 2207/30192; F21V 29/90
USPC ...................... 73/170.16–170.19
See application file for complete search history.

(56) References Cited

U.S. PATENT DOCUMENTS 8,555,714 B2 10/2013 Chae et al.

FOREIGN PATENT DOCUMENTS

| JP | 2004205406 A | * | 7/2004 |
|---|---|---|---|
| JP | 2014-219303 A | | 11/2014 |
| JP | 2017-191044 A | | 10/2017 |
| KR | 10-1061294 B1 | | 8/2011 |
| KR | 10-1123238 B1 | | 3/2012 |
| KR | 10-1304488 B1 | | 9/2013 |
| KR | 10-2200566 B1 | | 1/2021 |
| KR | 10-2537127 B1 | | 5/2023 |

OTHER PUBLICATIONS

KR Office Action dated May 27, 2024 as received in Application No. 10-2024-0043184.
KR Decision to Grant Dated Oct. 28, 2024 as received in Application No. 10-2024-0043184.

* cited by examiner

*Primary Examiner* — John E Breene
*Assistant Examiner* — Truong D Phan
(74) *Attorney, Agent, or Firm* — Maschoff Brennan (57) ABSTRACT

There is provided a device for measuring an amount of snowfall in consideration of a weight of the snowfall, comprising: a housing; a snow depth measuring unit configured to measure a depth of the snowfall outside the housing; a snow holding container configured to hold the snowfall whose depth has been measured by the snow depth measuring unit, wherein at least part of the snow holding container is positioned inside the housing; a heating unit configured to melt the snowfall held in the snow holding container, wherein the heating unit is formed in or on at least part of the snow holding container; and a snow weight measuring unit configured to hold meltwater and to measure a weight thereof, wherein the meltwater has been acquired by melting the snowfall with the heating unit.

9 Claims, 9 Drawing Sheets

DEVICE FOR MEASURING AN AMOUNT OF SNOWFALL IN CONSIDERATION OF A WEIGHT OF SNOWFALL

CROSS REFERENCE OF RELATED APPLICATION

This present application claims the benefit of the earlier filing date of Korean non-provisional patent application No. 10-2024-0043184, filed on Mar. 29, 2024, the entire contents of which being incorporated herein by reference.

FIELD OF THE DISCLOSURE

The present invention relates to a device for measuring an amount of snowfall in consideration of a weight of the snowfall; and more particularly, to the device configured to (i) determine a snow-to-liquid ratio (SLR) of the snowfall according to a meteorological condition, (ii) automatically operate for continuous observations, and (iii) collect meteorological data in real-time, thereby enhancing an accuracy of forecasts on the snowfall.

BACKGROUND OF THE DISCLOSURE

Various collapse accidents related to snow avalanche occur in winter. In particular, when it comes to relatively weak structures such as greenhouses or aged buildings, not only a snow depth but also moisture content in the snowfall affects probabilities of the collapse accidents. For example, according to the Korea Meteorological Administration, more than 60 cm of snowfall accumulated during a heavy snowfall from December 21 to 24, 2022. To make the matters worse, a weight of that heavy snowfall was effectively doubled since the heavy snowfall contained enough moisture, which led to aggravation of damages to the relatively weak structures. Thus, in order to prevent such damages, it is necessary to provide information on the weight of the snowfall as well as the snow depth of the snowfall.

For providing such information, the moisture content in the snowfall, i.e., a snow-to-liquid ratio (SLR) of the snowfall, is important. In detail, the SLR is obtained by dividing the snow depth of the snowfall by the weight of the snowfall. For reference, the SLR may be calculated with data acquired by an Automatic Weather Station (AWS) and visual observations using conventional snow gauges. However, these conventional methods require that both of the AWS and the snow gauges be installed at a same location and there is an additional drawback of requiring multiple observation devices in order to calculate the SLR at a plurality of locations. As a result, there is a growing need for an efficient method of determining the SLR of the snowfall.

SUMMARY OF THE DISCLOSURE

It is an object of the present disclosure to solve all the aforementioned problems.

It is another object of the present disclosure to provide a device for determining a snow-to-liquid ratio (SLR) of snowfall and thus precisely and efficiently measuring an amount of the snowfall.

It is still another object of the present disclosure to configure the device as a single device, thereby reducing an inefficiency of installing conventional multiple observation devices at a plurality of locations for calculating the SLR.

In accordance with one aspect of the present disclosure, there is provided a device for measuring an amount of snowfall in consideration of a weight of the snowfall, comprising: a housing; a snow depth measuring unit configured to measure a depth of the snowfall outside the housing; a snow holding container configured to hold the snowfall whose depth has been measured by the snow depth measuring unit, wherein at least part of the snow holding container is positioned inside the housing; a heating unit configured to melt the snowfall held in the snow holding container, wherein the heating unit is formed in or on at least part of the snow holding container; and a snow weight measuring unit configured to hold meltwater and to measure a weight thereof, wherein the meltwater has been acquired by melting the snowfall with the heating unit; wherein the snow holding container includes: an outer container where the heating unit is formed, whose upper end is interlinked with an outer container gate formed on an upper surface of the housing and whose lower end is connected to a funneling part configured to direct the meltwater into the snow weight measuring unit; and an inner container having (i) an inner container sidewall coupled with a 1-st movable column such that the inner container sidewall moves up and down according to a movement of the 1-st movable column and (ii) an inner container gate coupled with a 2-nd movable column such that the inner container gate moves up and down according to a movement of the 2-nd movable column, wherein at least part of the inner container is located inside a hollow structure of the outer container.

As one example, the snow holding container is characterized in that, in response to the inner container gate being located within a preset threshold distance from the outer container gate according to an ascent of the 2-nd movable column, the outer container gate is opened, and thus the inner container sidewall is exposed to an exterior of the housing according to an ascent of the 1-st movable column, thereby allowing the inner container to hold the snowfall accumulated on a partial area, among an entire area of an upper surface of the housing, which corresponds to a cross-section of the inner container, and then the inner container holding the snowfall is allowed to return into the housing according to a descent of the 1-st movable column and the 2-nd movable column.

As one example, the device further comprises an insulation unit where an insulation opening to be coupled with the outer container is formed, and wherein the insulation unit is installed on at least two side surfaces of the housing so as to be parallel to a cross-section of the outer container; wherein the heating unit is formed at a 1-st portion of the outer container, wherein the 1-st portion is located below a specific cross-section of the outer container, and wherein the specific cross-section is a cross-section of the outer container at the insulation opening, to thereby prevent thermal energy due to the heating unit from transferring to a 2-nd portion of the outer container, wherein the 2-nd portion is a portion of the outer container above the specific cross-section.

As one example, the snow depth measuring unit includes: a supporting column; and a snow depth sensor configured to move up and down inside the supporting column; wherein a lower end of the supporting column is connected to the funneling part with a plurality of wires, wherein the supporting column is fixed by an inner container opening such that an upper end of the supporting column is located to be higher than the upper surface of the housing, and wherein the inner container opening having a size corresponding to a cross-section of the supporting column is formed at a center of the inner container gate.

As one example, the snow holding container further includes: a plurality of gate controlling wires each of which has one end connected to its corresponding one of multiple 1-st connection points located at the outer container and an opposite end connected to its corresponding one of multiple 2-nd connection points located at a lower surface of the inner container gate; wherein, in case the inner container gate is located above a preset tension threshold point according to an operation of the 2-nd movable column, the inner container gate remains closed due to no tension applied to each of the 2-nd connection points by its corresponding gate controlling wire, and wherein, in case the inner container gate descends so as to reach the tension threshold point according to a descent of the 2-nd movable column, the inner container gate is opened due to tension applied to each of the 2-nd connection points by its corresponding gate opening wire, to thereby direct the meltwater into the snow weight measuring unit through the funneling part.

In accordance with another aspect of the present disclosure, there is provided device for measuring an amount of snowfall in consideration of a weight of the snowfall, comprising: a housing; a snow depth measuring unit configured to measure a depth of the snowfall outside the housing; a snow holding container configured to hold the snowfall whose depth has been measured by the snow depth measuring unit, wherein at least part of the snow holding container is positioned inside the housing; a heating unit configured to melt the snowfall held in the snow holding container, wherein the heating unit is formed in or on at least part of the snow holding container; and a snow weight measuring unit configured to hold meltwater and to measure a weight thereof, wherein the meltwater has been acquired by melting the snowfall with the heating unit; wherein the device further comprises: at least one snowfall removal plate configured to cover a subarea of an upper surface of the housing and be controlled according to an operation of at least one 3-rd movable column, wherein the subarea of the upper surface corresponds to an area, among an entire area of the upper surface of the housing, on which the snowfall is not held by the snow holding container; wherein one end of the 3-rd movable column is connected to a power unit and an opposite end of the 3-rd movable column is connected to the snowfall removal plate such that (i) in response to an ascent of the 3-rd movable column, an angle between the snowfall removal plate and the upper surface of the housing becomes same as or larger than a preset removal plate threshold angle, and thus the snowfall accumulated on the snowfall removal plate is removed and (ii) in response to a descent of the 3-rd movable column, the snowfall removal plate covers the upper surface of the housing, and thus protects an interior of the housing.

As one example, the snow weight measuring unit includes a drainage opening configured to drain the meltwater to an exterior of the housing; wherein, in response to a result of measuring a weight of the meltwater in the snow weight measuring unit being unchanged for a predetermined period of time, the meltwater is drained through the drainage opening, the heating unit heats the snow holding container to remove residual moisture thereon, and then the snow holding container is cooled.

As one example, the device further comprises a thermometer configured to measure a temperature outside the housing; a GPS configured to acquire locational information including a latitude and a longitude of where the device is located; an electronic component part, at a lower part of the housing, configured to accommodate a battery and a computing device and to protect the battery and the computing device from the meltwater; and an electric generator including a solar module, outside the housing, which is connected to the battery and configured to absorb solar energy.

As one example, the computing device includes at least one memory configured to save instructions for operations of the device; at least one processor configured to execute the instructions; a database configured to store information acquired from the thermometer, the GPS, the snow depth measuring unit, and the snow weight measuring unit as meteorological information; and a communication unit configured to transmit the meteorological information to other computing devices.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention.

In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to carry out the present invention easily, the example embodiments of the present invention by referring to attached diagrams will be explained in detail as shown below.

Figure 1:
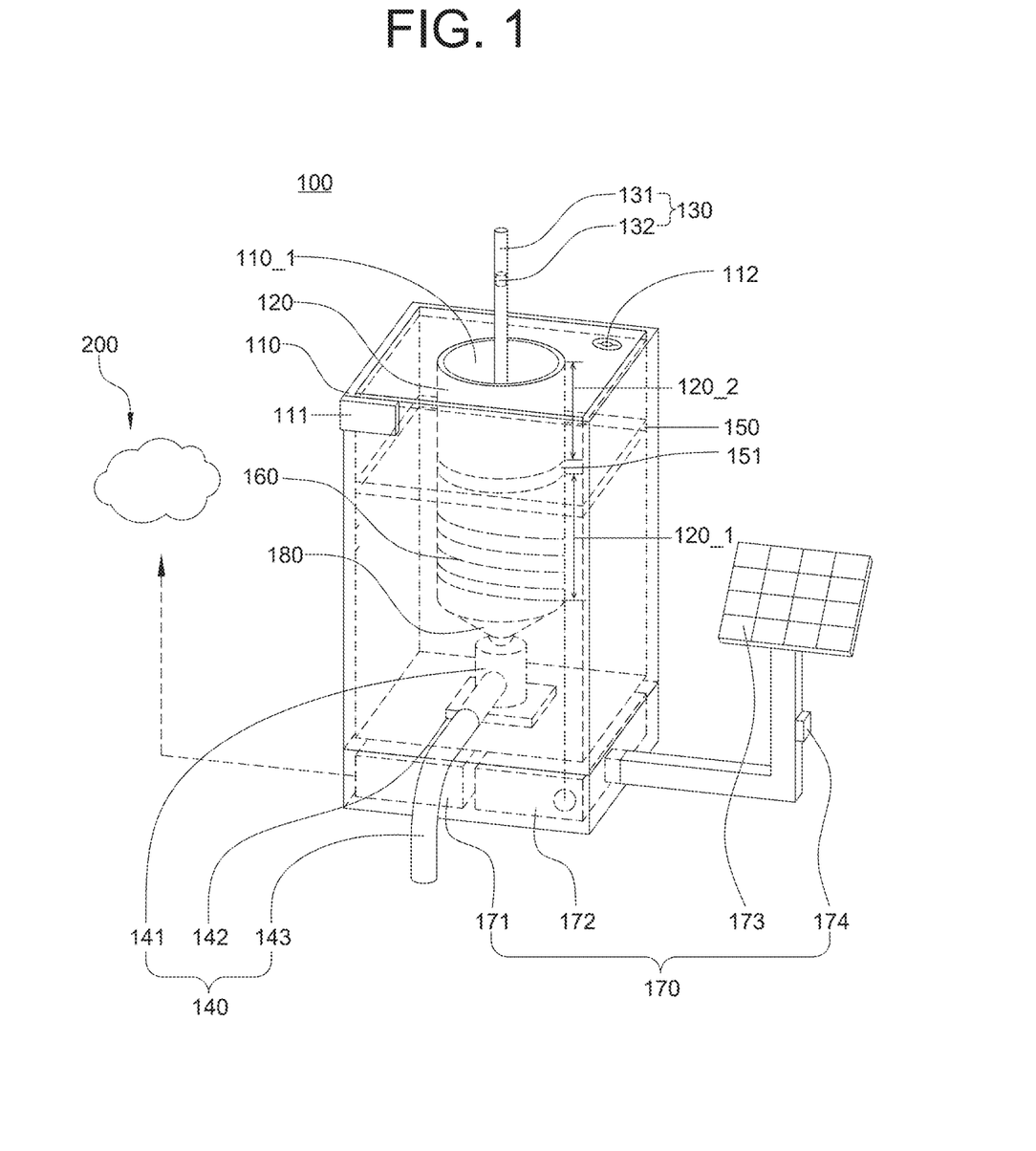
FIG. 1 is a drawing schematically illustrating a device for measuring an amount of snowfall in consideration of a weight of the snowfall in accordance with one example embodiment of the present disclosure.

FIG. 1 is a drawing schematically illustrating a device for measuring an amount of snowfall in consideration of a weight of the snowfall in accordance with one example embodiment of the present disclosure.

By referring to FIG. 1, a device 100 for measuring an amount of the snowfall may include a housing 110, a snow depth measuring unit 130 configured to measure a snow depth of the snowfall accumulated on an upper surface of the housing 110, a snow holding container 120 configured to hold the snowfall whose depth has been measured by the snow depth measuring unit 130, and a snow weight measuring unit 140 for holding meltwater and measuring a weight thereof. Herein, the meltwater has been acquired by melting the snowfall with a heating unit 160.

Additionally, the device 100 may further include a thermometer 111, positioned at an outer wall of the housing 110 and configured to measure an ambient temperature outside the housing 110, and a leveling component 112 for assisting a conveyance and an installation of the device 100. Furthermore, the upper surface of the housing 110 may be configured such that an angle thereof can be adjusted to minimize an effect of a weather transition (i.e., a weather change between snowfall and another form of the precipitation) and to remove the snowfall accumulated on the upper surface of the housing 110. Further, details on adjusting the upper surface of the housing 110 will be described later with FIG. 4B.

Next, at least a part of the snow holding container 120 is positioned inside the housing 110. Further, the snow holding container 120 may include an outer container and an inner container (not shown) which will be described later. For better understanding, only the outer container of the snow holding container 120 is illustrated in FIG. 1. That is, an overall structure of the device 100 is depicted with the outer container connected to an insulation unit 150, the heating unit 160, and a funneling part 180. A detailed description on the structure and operations of the snow holding container 120 will be provided with FIGS. 2A to 2C and 3A to 3C.

And the inner container (not shown) of the snow holding container 120 is configured to hold the snowfall. Also, at least part of the inner container (not shown) may be located inside a hollow space of the outer container in such a way that the inner container (not shown) can move up and down. In addition, the outer container may be connected to the funneling part 180 which directs the meltwater to the snow weight measuring unit 140. Also, the device 100 may include an outer container gate (not shown) which can control the snow holding container 120 to bring in the snow from the upper surface of the housing 110. In detail, an opening 110_1 corresponding to a cross-section of the snow holding container 120 is formed on at least part of the upper surface of the housing 110. Thus, the outer container gate (not shown) may be formed on the upper surface of the housing 110 to cover the opening 110_1, but it is not limited thereto. For example, the outer container gate (not shown) may be directly connected to the snow holding container 120 and thus exposed to the exterior of the housing 110 through the opening 110_1 formed on the upper surface of the housing 110.

Furthermore, the device 100 may include the heating unit 160 formed at a first portion 120_1 of the outer wall of the snow holding container 120, i.e., at least part of the outer container. Further, the heating unit 160 is configured to melt the snowfall held in the inner container (not shown) by applying heat. In FIG. 1, the heating unit 160 is illustrated as a coil, i.e., a heating coil, surrounding the outer container of the snow holding container 120, but it is not limited thereto. For example, at least part of the snow holding container 120 may transfer thermal energy obtained from solar radiation to the snow held in the inner container.

Meanwhile, the snow depth measuring unit 130 may include a supporting column 131 and a snow depth sensor 132. By referring to FIG. 1, at least part of the supporting column 131 is positioned above the housing 110 and the snow depth sensor 132 installed inside the supporting column 131 may move up and down. Thus, the snow depth sensor 132 can move up to be positioned higher than the upper surface of the housing 110 to measure the depth of the snowfall, i.e., a height of the snowfall, accumulated on the upper surface of the housing 110 by using various means. As one example, the snow depth sensor 132 may emit electromagnetic waves onto a side surface of the snowfall in a radial direction of the supporting column 131 and detect electromagnetic waves reflected from the side surface of the snowfall to measure the depth of the snowfall. As another example, the snow depth sensor 132 may capture and analyze images of the snowfall accumulated on the upper surface of the housing 110 to determine the snow depth. However, it is not limited to. As still another example, the snow depth sensor 132 may also be installed outside the supporting column 131. Additionally, the snow depth measuring unit 130 may include any other devices capable of measuring the amount of the snowfall.

Meanwhile, after the heating unit 160 melts the snowfall held in the snow holding container 120, the meltwater may be directed, through the funneling part 180, into a weight measuring container 141 of the snow weight measuring unit 140. Then, the weight of the meltwater in the measuring container 141 is measured by using a scale 142. Herein, in response to a result of measuring a weight of the meltwater in the weight measuring container 141 being unchanged for a predetermined period of time, the measurement for the weight of the snow is considered to be completed, and thus the meltwater is drained through a drainage opening 143. In order to prevent leakage due to the meltwater, the weight measuring container 141, the scale 142, and the drainage opening 143 may be manufactured as an integrated structure. Also, since some residual moisture may remain in the snow holding container 120 and the weight measuring container 141 even after the meltwater is drained through the drainage opening 143, it may cause errors in subsequent measurements on the weight of the snowfall. To prevent the errors, in response to draining the meltwater through the drainage opening 143, the heating unit 160 may operate to remove the residual moisture from at least part of the snow holding container 120 and the measuring container 141. Further, the heating unit 160 may be additionally installed at or near the measuring container 141.

Meanwhile, the insulation unit 150 may be installed inside the housing 110 such that the insulation unit 150 extends across at least two side surfaces of the housing 110 so as to be parallel to the upper surface of the housing 110. Also, an insulation opening 151 is formed at a center of the insulation unit 150 and a size of the insulation opening 151 corresponds to a specific cross-section of the snow holding container 120, such that the insulation unit 150 can be coupled with the outer container of the snow holding container 120. Herein, the specific cross-section is a cross-section of the snow holding container 120 at the insulation opening 151. Then, the heating unit 160 may be installed at a 1-st portion 120_1 of the outer container, the 1-st portion 120_1 being located below the specific cross-section of the outer container at the insulation opening 151, thereby preventing thermal energy of the heating unit 160 from being transferred to a 2-nd portion 120_2 of the outer container which is located above the specific cross-section.

Finally, in order to support continuous and automated measurements of the device 100, the device 100 may further include an electronic component part 170 at a lower part of the housing 110. The electronic component part 170 may include a computing device 171 which controls operations of the device 100, and a battery 172 which supplies power to the computing device 171 for the operations of the device 100. Additionally, the device 100 may also include a generator 173 connected to the battery 172 and a GPS 174 for transmitting location information including a latitude and a longitude of where the device is located. Herein, the battery 172 may directly supply power to components such as the thermometer 111, the snow holding container 120, the snow depth sensor 132, the snow weight measuring unit 140, the GPS 174, and the heating unit 160. Alternatively, the battery 172 may be connected to the computing device 171 so that the computing device 171 can control each power supply for each component as mentioned above.

Furthermore, the electronic component part 170, which includes the computing device 171 and the battery 172, may be stored in a waterproof box to minimize the impact of leakages and condensations inside the housing 110. Also, the waterproof box may be made of a material which does not block thermal energy from the heating unit 160, to thereby prevent the battery 172 from discharging in low-temperature conditions. And, in FIG. 1, the generator 173 is depicted as a generator positioned outside the housing 110 with a solar module that absorbs solar energy. However, it is not limited thereto, and those skilled in the art may select various electronic power generators based on their conditions and environments in which the invention can be implemented.

And, the computing device 171 may include a memory (not shown) configured to store instructions for operating the device 100, a processor (not shown) configured to execute the instructions, a database (not shown) configured to store information acquired from the thermometer 111, the GPS 174, the snow depth measuring unit 130, and the snow weight measuring unit 140 as meteorological information, and a communication unit (not shown) configured to transmit the meteorological information stored in the database (not shown) to an external computing device 200. The external computing device 200 may be linked with an AWS to process the meteorological information or transmit the instructions to the communication unit (not shown) of the computing device 171.

The operation of the device 100 for measuring the amount of the snowfall will be further described with FIGS. 2A to 2C, 3A to 3C, 4A and 4B.

Figure 2A:
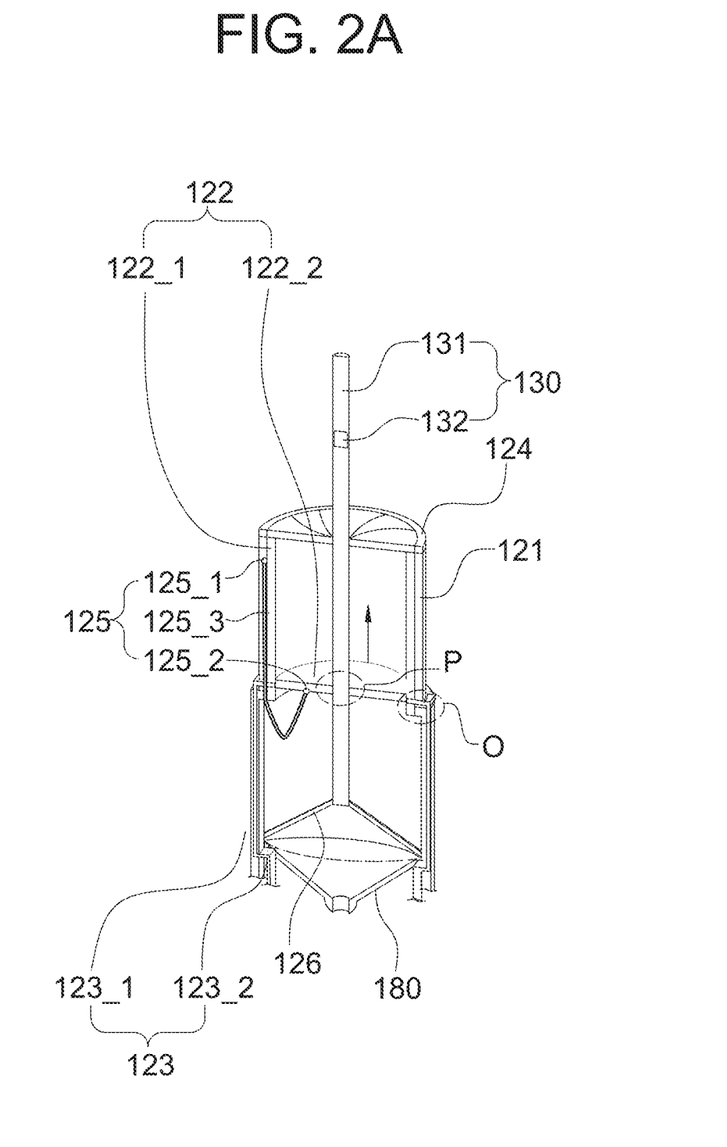
FIGS. 2A to 2C are cross-sectional drawings schematically illustrating a snow holding container and operations for exposing the snow holding container to an exterior of a housing and bringing in snow from an upper surface of the housing in accordance with one example embodiment of the present disclosure.
Figure 2B:
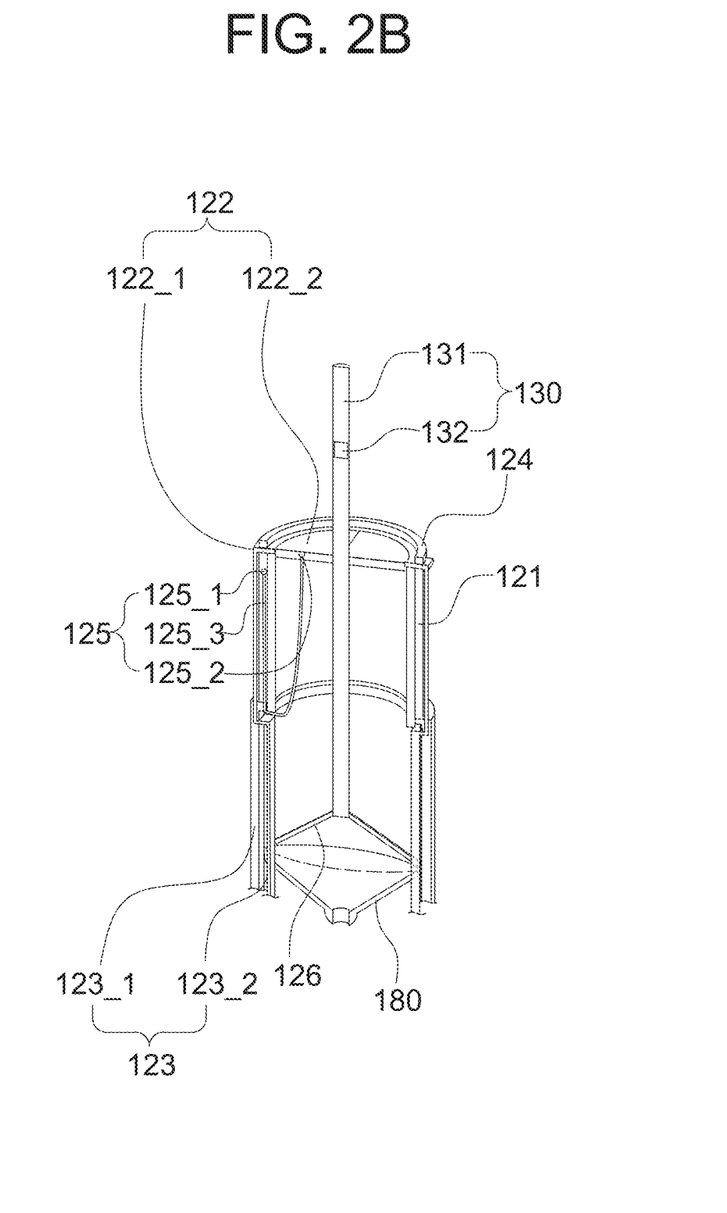
Figure 2C:
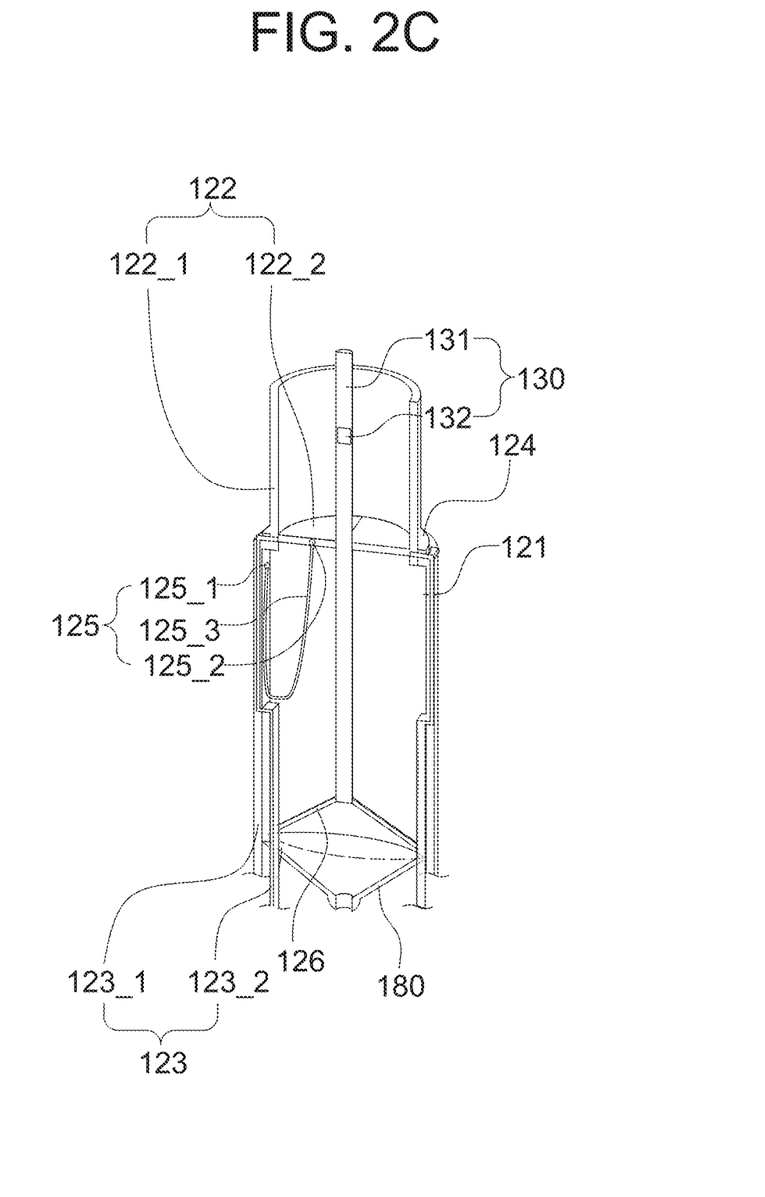

FIGS. 2A to 2C are cross-sectional drawings schematically illustrating a snow holding container and operations for exposing the snow holding container to an exterior of a housing and bringing in snow from an upper surface of the housing in accordance with one example embodiment of the present disclosure.

By referring to FIG. 2A, the snow holding container 120 of the device 100 may include the outer container 121, where the heating unit 150 may be formed, whose lower end is coupled to the funneling part 180 for directing the meltwater to the snow weight measuring unit 140. Further, the outer container 121 may be interlinked with the outer container gate 124 formed on the upper surface of the housing 110, which means that (i) the outer container gate 124 is positioned to cover the opening 110_1 on the upper surface of the housing 110 or (ii) the outer container gate 124 is directly connected to a upper end of the outer container 121 and exposed to the exterior of the housing 110 through the opening 1101, under the condition that the opening 1101 corresponding to the cross-section of the outer container 121 or the cross-section of the inner container 122 is formed on the upper surface of the housing 110. However, the configurations for the outer container gate 124 is not limited thereto. Also, the outer container gate 124 in FIGS. 2A to 2C is illustrated as a diaphragm structure capable of opening and closing, but it is not limited thereto.

As explained with FIG. 1, the snow holding container 120 of the device 100 may further include an inner container 122, which moves up and down inside the hollow structure of the outer container 121 according to movements of movable columns 123. Also, the inner container 122 may have an inner container sidewall 122_1 and an inner container gate 122_2, while the movable columns 123 may have a 1-st movable column 123_1 and a 2-nd movable column 123_2. In particular, the inner container sidewall 1221 may be coupled to a 1-st movable column 123_1 such that the inner container sidewall 122_1 moves up and down according to the movements of the 1-st movable column 123_1, while the inner container gate 122_2 is coupled to a 2-nd movable column 123_2 such that the inner container gate 122_2 moves up and down according to movements of the 2-nd movable column 123_2. Additionally, an inner diameter of the 1-st movable column 123_1, which is formed as a hollow structure, may be larger than an outer diameter of the 2-nd movable column 123_2, ensuring that the movement of the 2-nd movable column 123_2 is not obstructed. Also, in FIG. 2A, protrusions P are formed on both the 1-st movable column 123_1 and the 2-nd movable column 123_2. In detail, the protrusion on the 1-st movable column 123_1 is coupled to the lower side of the inner container sidewall 122_1 and the protrusion on the 2-nd movable column 123_2 is coupled to the side of the inner container gate 122_2. However, it is not limited thereto. For example, one protrusion may be formed on the inner container sidewall 122_1 to couple with the 1-st movable column 123_1 and another protrusion may be formed on the inner container gate 122_2 to couple with the 2-nd movable column 123_2.

By referring to FIG. 2A again, the inner container gate 1222 may be configured to open and close under a predetermined condition. More specifically, as described later in FIGS. 3A to 3C, the inner container gate 1222 may be formed as multiple segments to control opening and closing thereof. Additionally, the inner container gate 1222 may be formed with a hinge structure made of an elastic material to maintain a closed state while the inner container 122 is holding the snowfall, but it is not limited thereto. Furthermore, an inner container opening O, corresponding to a cross-section of a supporting column 131 of the snow depth measuring unit 130, may be formed at a center of the inner container gate 122_2. Herein, a lower end of the supporting column 131 is connected to the funneling part 180 with a plurality of wires 126 and is movably coupled through the inner container O. As a result, an upper end of the supporting column 131 is located higher than the upper surface of the housing 110. Accordingly, the snow depth sensor 132, installed inside the supporting column 131, may measure the depth of the snowfall accumulated on the upper surface of the housing 110 and transmit the measurement data to the computing device 171.

Additionally, the outer container 121 and the inner container gate 122_2 may have a gate controlling unit 125 which regulates opening and closing of the inner container gate 122_2. The gate controlling unit 125 may contain a plurality of gate controlling wires 125_3, whose each one end is connected to its corresponding each one of multiple 1-st connection points 125_1 located at the outer container 121 and each opposite end is connected to its corresponding each one of multiple 2-nd connection points 125_2 located at a lower surface of the inner container gate 122_2. The operations of the gate control unit 125 will be described later with reference to FIGS. 3A to 3C.

Next, by referring now to FIG. 2B, in response to detecting that the snow depth sensor 132 has finished measuring the depth of the snowfall on the upper surface of the housing 110, the 2-nd movable column 123_2 may ascend, thereby locating the inner container gate 122_2 to be within a preset threshold distance from the lower end of the outer container gate 124. In response to this ascent of the inner container gate 122_2, the outer container gate 124 may be opened.

Finally, by referring to FIG. 2C, in response to the opening of the outer container gate 124, the 1-st movable column 123_1 may ascend, to thereby move the inner container sidewall 122_1 upward. As a result, the inner container 122 may hold the snowfall accumulated on a partial area, among an entire area of the upper surface of the housing 110, which corresponds to the cross-section of the inner container 122.

The process of returning the inner container 122 holding the snowfall into the interior of the housing 110 will be described with FIGS. 3A to 3C.

Figure 3A:
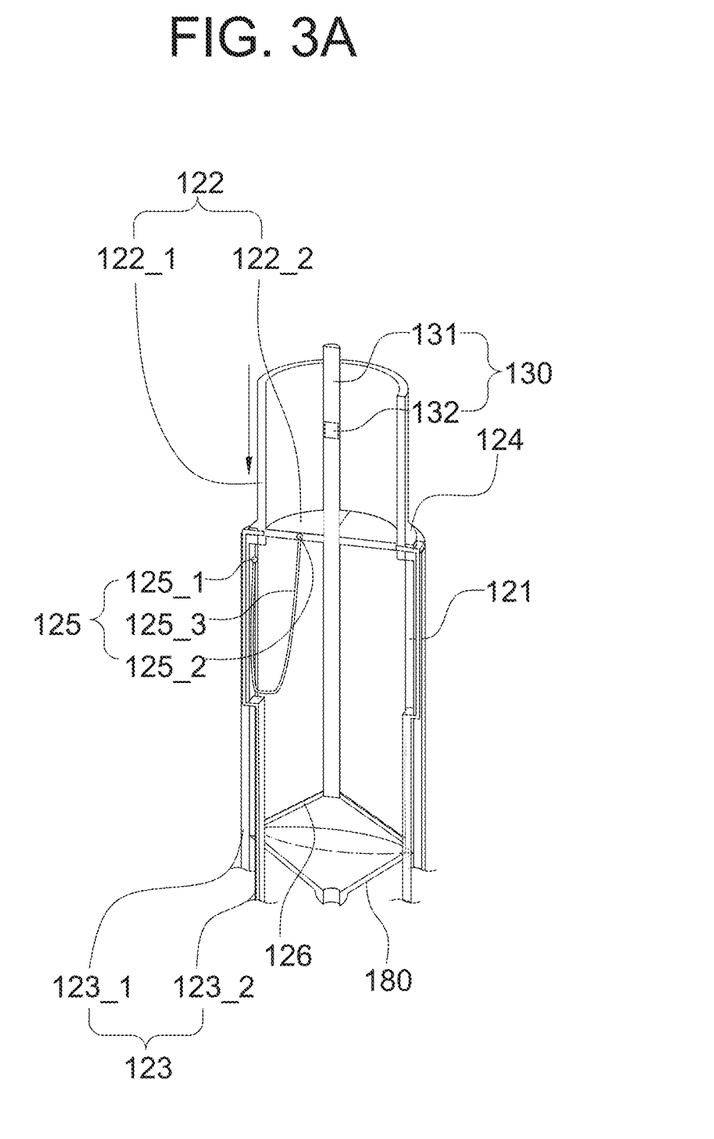
FIGS. 3A to 3C are cross-sectional drawings schematically illustrating operations for making the snow holding container returning into the housing of the device while holding the snow therein in accordance with one example embodiment of the present disclosure.
Figure 3B:
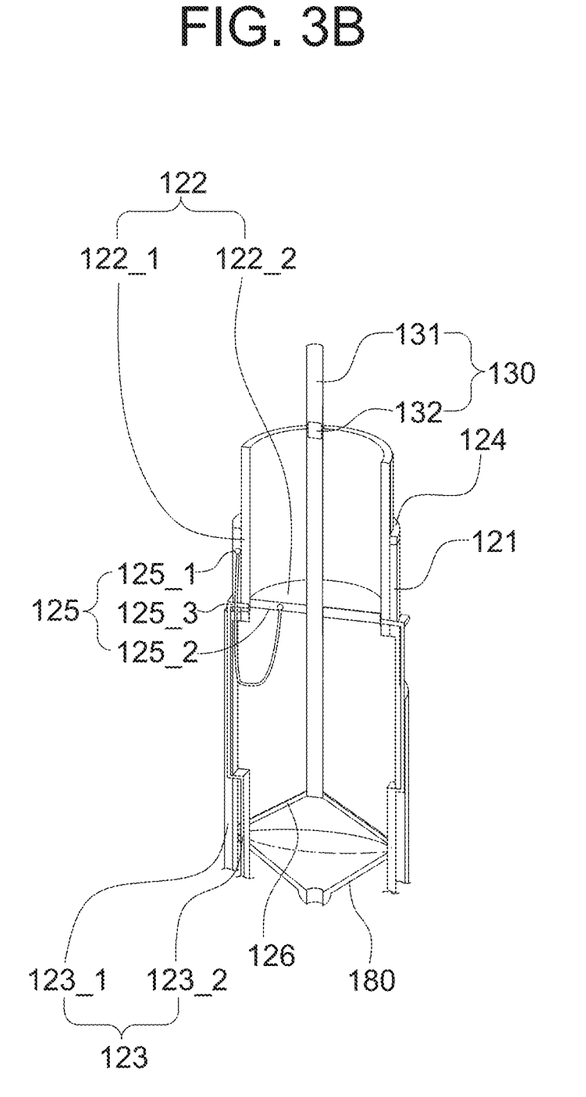
Figure 3C:
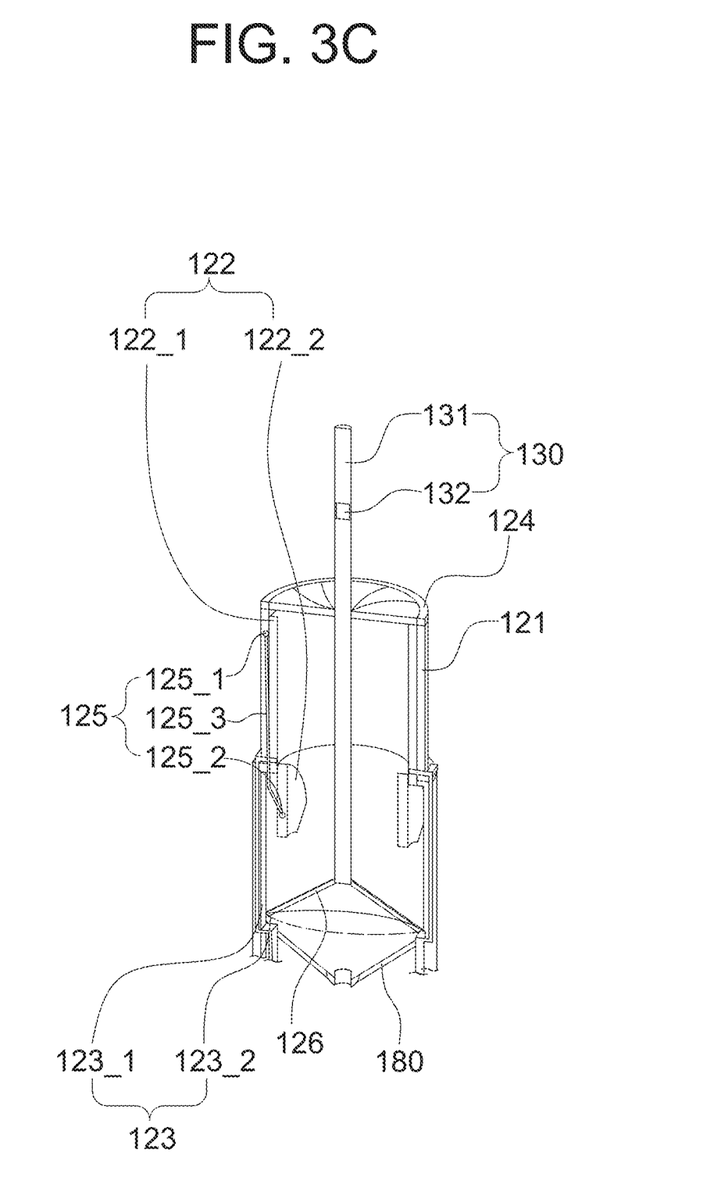

FIGS. 3A to 3C are cross-sectional drawings schematically illustrating operations for making the snow holding container returning into the housing of the device while holding the snow therein accordance with one example embodiment of the present disclosure.

By referring to in FIG. 3A, each of said one ends of each of the gate controlling wires 125_3 is connected to its corresponding each first connection point 125_1 located on the outer container 121, while each of said opposite ends of the gate controlling wires 125_3 is connected to its corresponding each 2-nd connection point 125_2 located on a bottom surface of the inner container gate 122_2. Accordingly, at least part of the gate controlling wires 125_3 may be positioned in-between an inner side of the outer container 121 and the bottom surface of the inner container gate 1222. Herein, only one of the 1-st connection points 125_1, only one of the 2-nd connection points 125_2, and only one of the gate controlling wire 125_3 are illustrated for clearly illustrating the operations of the gate controlling wires 125_3 in FIG. 3. However, in reality, a plurality of the gate controlling wires 125_3 may be connected to the outer container 121 through its respective 1-st connection points 125_1 and to the inner container gate 122_2 through its respective 2-nd connection points 125_2. Further, for clarity, the snowfall held in the snow holding container 120 is omitted in FIGS. 3A to 3C.

Meanwhile, once the inner container 122 ascends and holds the snowfall, as shown FIG. 3A, both of the 1-st movable column 123_1 and the 2-nd movable column 123_2 descend simultaneously, to thereby lower both of the inner container sidewall 122_1 and the inner container gate 122_2. Herein, the inner container gate 122_2 remains in a closed state, as described in FIGS. 2A to 2C.

By referring to FIGS. 3B and 3C, the operation of the gate control unit 125 for controlling opening and closing of the inner container gate 122_2 is explained. In FIG. 3B, even though the inner container 122 has descended relative to its state in FIG. 3A, a distance between the first connection point 125_1 and the 2-nd connection point 125_2 is shorter than an original length of the gate controlling wires 125_3, i.e., a length of the gate controlling wires 125_3 which is fully tensioned. Therefore, the gate controlling wires 125_3 do not apply tension to its corresponding each 2-nd connection point 125_2 so that the inner container gate 1222 remains closed. Then, as the inner container 122 continues to descend from the state shown in FIG. 3B, the inner container 122 eventually reaches a tension threshold point, as shown in FIG. 3C. Herein, a distance between the first connection point 125_1 and the 2-nd connection point 125_2 along with a length of the gate controlling wires 125_3, may determine the tension threshold point at which a tension due to the gate controlling wire 125_3 is applied to its corresponding each 2-nd connection point 125_2. Then, in response to the inner container 122 reaching the tension threshold point, i.e., in response to applying the tension to each one of the 2-nd connection points 125_2 due to its corresponding each gate controlling wire 125_3, the inner container gate 122_2 may open, the outer container gate 124 may close, and the heating unit 160 formed on at least part of the outer container 121 may heat the snowfall held in the inner container 122 to thereby acquire the meltwater. After this process, the meltwater held in the inner container 122 is transferred to the snow weight measuring unit 140 through the funneling part 180 so that the weight measuring unit 140 can measure the weight of the snowfall whose depth was measured, but it is not limited thereto. As one example, in case the inner container 122 may descend without reaching the tension threshold point, the inner container gate 122_2 remains closed and is located in a position where the inner container gate 122_2 does not interfere with the closing of the outer container gate 124. Under those conditions, in response to the closing of the outer container gate 124, the heating unit 160 may operate for a predetermined period to heat the snowfall in the inner container 122. After the heating is completed, the inner container 122 may continue descending so as to reach the tension threshold point and accordingly the inner container gate 122_2 is opened, to thereby direct the meltwater into the snow weight measuring unit 140 through the funneling part 180.

Meanwhile, additional operations may be required to automate the subsequent measurements after a weight measurement of the snow weight measuring unit 140 is completed. These additional operations will be further described with reference to FIGS. 4A and 4B.

Figure 4A:
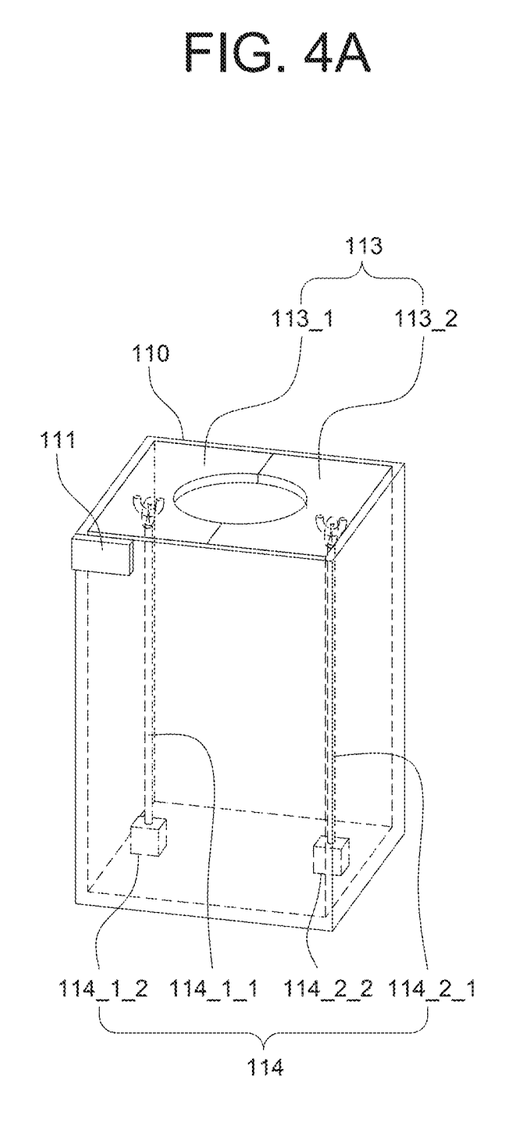
FIGS. 4A and 4B are drawings schematically illustrating snowfall removal plate and operations thereof in accordance with one example embodiment of the present disclosure.
Figure 4B:
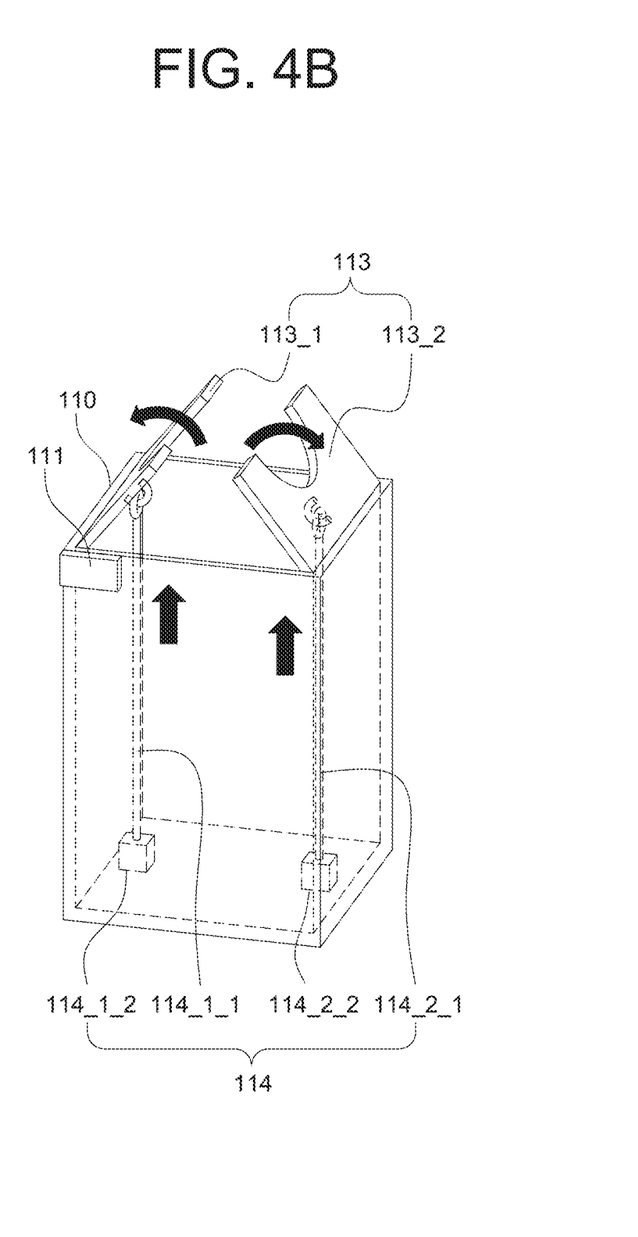

FIGS. 4A and 4B are drawings schematically illustrating a snowfall removal plate and operations thereof in accordance with one example embodiment of the present disclosure.

By referring to in FIG. 4A, snowfall removal plates 113 may be formed to cover a subarea of the upper surface of the housing 110. Herein, the subarea of the upper surface of the housing 110 corresponds to an area, among the entire area of the upper surface of the housing 110, on which the snowfall is not held by the inner container 122. Also, the snowfall removal plates 113 are illustrated with two separate subplates, i.e., a 1-st snowfall removal plate 113_1 and a 2-nd snowfall removal plate 1132, but the number of subplates is not limited to two. For opening and closing of the snowfall removal plates 113, the 1-st snowfall removal plate 113_1 and the 2-nd snowfall removal plate 1132 may be connected to a snowfall removal plate operation unit 114. The snowfall removal plate operation unit 114 may include 3-rd movable columns 114_1_1 and 114_2_1 as well as power units 114_1_2 and 114_2_2. Specifically, each one end of the 1-st snowfall removal plate 113_1 and the 2-nd snowfall removal plate 113_2 may be respectively connected to its corresponding one of the 3_1-st movable column 114_1_1 and the 3_2-nd movable column 114_2_1, while its opposite end is connected to its corresponding one of the power units 114_1_2 and 114_2_2. Herein, each of the power units 114_1_2 and 114_2_2 may control the ascent and descent of its respective one of the 3_1-st movable column 114_1_1 and the 3_2-nd movable column 114_2_1 by using motors, but it is not limited thereto. As one example, hydraulic pistons may also be used to control the movements of the 3-rd movable columns 114_1_1 and 114_2_1.

Also, by referring to in FIG. 4B, in response to an ascent of each of the 3-rd movable columns 114_1_1 and 114_2_1 due to the operation of each of the power units 114_1_2 and 114_2_2, each angle between the upper surface of the housing 110 and each subplate of the snowfall removal plates 113 increases. When the angle becomes same as or larger than a preset removal plate threshold angle, the snowfall accumulated on each subplate of the snowfall removal plates 113 may slide off and be removed. Then, in response to each descent of each of the 3-rd movable columns 114_1_1 and 114_2_1, the snowfall removal plate 113 may cover the upper surface of the housing 110, and thus protect the interior of the housing 110. The operation of the snowfall removal plate control unit 114, and the resulting operation of the snowfall removal plate 113, which are explained above, may occur immediately after snowfall has been measured and received in the inner container 122. Alternatively, in response to draining of the meltwater whose weight is measured through the drainage opening (not shown), the snowfall removal plate 113 may operate as explained above.

The present disclosure has an effect of providing a device for determining the SLR of the snowfall and thus precisely and efficiently measuring the amount of the snowfall.

The present disclosure has another effect of configuring the device as a single device, thereby reducing an inefficiency of installing conventional multiple observation devices at a plurality of locations for calculating the SLR.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A device for measuring an amount of snowfall in consideration of a weight of the snowfall, comprising:
   a housing;
   a snow depth measuring unit configured to measure a depth of the snowfall outside the housing;
   a snow holding container configured to hold the snowfall whose depth has been measured by the snow depth measuring unit, wherein at least part of the snow holding container is positioned inside the housing;
   a heating unit configured to melt the snowfall held in the snow holding container, wherein the heating unit is formed in or on at least part of the snow holding container; and
   a snow weight measuring unit configured to hold meltwater and to measure a weight thereof, wherein the meltwater has been acquired by melting the snowfall with the heating unit;
   wherein the snow holding container includes:
   an outer container where the heating unit is formed, whose upper end is interlinked with an outer container gate formed on an upper surface of the housing and whose lower end is connected to a funneling part configured to direct the meltwater into the snow weight measuring unit; and
   an inner container having (i) an inner container sidewall coupled with a 1-st movable column such that the inner container sidewall moves up and down according to a movement of the 1-st movable column and (ii) an inner container gate coupled with a 2-nd movable column such that the inner container gate moves up and down according to a movement of the 2-nd movable column, wherein at least part of the inner container is located inside a hollow structure of the outer container.

2. The device of claim 1, wherein the snow holding container is characterized in that:
   in response to the inner container gate being located within a preset threshold distance from the outer container gate according to an ascent of the 2-nd movable column, the outer container gate is opened, and thus the inner container sidewall is exposed to an exterior of the housing according to an ascent of the 1-st movable column, thereby allowing the inner container to hold the snowfall accumulated on a partial area, among an entire area of an upper surface of the housing, which corresponds to a cross-section of the inner container, and then the inner container holding the snowfall is allowed to return into the housing according to a descent of the 1-st movable column and the 2-nd movable column.

3. The device of claim 1, further comprising: an insulation unit where an insulation opening to be coupled with the outer container is formed, and wherein the insulation unit is installed on at least two side surfaces of the housing so as to be parallel to a cross-section of the outer container;
   wherein the heating unit is formed at a 1-st portion of the outer container, wherein the 1-st portion is located below a specific cross-section of the outer container, and wherein the specific cross-section is a cross-section of the outer container at the insulation opening, to thereby prevent thermal energy due to the heating unit from transferring to a 2-nd portion of the outer container, wherein the 2-nd portion is a portion of the outer container above the specific cross-section.

4. The device of claim 1, wherein the snow depth measuring unit includes: a supporting column; and a snow depth sensor configured to move up and down inside the supporting column;
   wherein a lower end of the supporting column is connected to the funneling part with a plurality of wires, wherein the supporting column is fixed by an inner container opening such that an upper end of the supporting column is located to be higher than the upper surface of the housing, and wherein the inner container opening having a size corresponding to a cross-section of the supporting column is formed at a center of the inner container gate.

5. The device of claim 1, wherein the snow holding container further includes: a plurality of gate controlling wires each of which has one end connected to its corresponding one of multiple 1-st connection points located at the outer container and an opposite end connected to its corresponding one of multiple 2-nd connection points located at a lower surface of the inner container gate;

wherein, in case the inner container gate is located above a preset tension threshold point according to an operation of the 2-nd movable column, the inner container gate remains closed due to no tension applied to each of the 2-nd connection points by its corresponding gate controlling wire, and wherein, in case the inner container gate descends so as to reach the tension threshold point according to a descent of the 2-nd movable column, the inner container gate is opened due to tension applied to each of the 2-nd connection points by its corresponding gate opening wire, to thereby direct the meltwater into the snow weight measuring unit through the funneling part.

6. The device of claim 1, wherein the snow weight measuring unit includes: a drainage opening configured to drain the meltwater to an exterior of the housing;

wherein, in response to a result of measuring a weight of the meltwater in the snow weight measuring unit being unchanged for a predetermined period of time, the meltwater is drained through the drainage opening, the heating unit heats the snow holding container to remove residual moisture thereon, and then the snow holding container is cooled.

7. The device of claim 1, further comprising:
a thermometer configured to measure a temperature outside the housing;
a GPS configured to acquire locational information including a latitude and a longitude of where the device is located;
an electronic component part, at a lower part of the housing, configured to accommodate a battery and a computing device and to protect the battery and the computing device from the meltwater; and
an electric generator including a solar module, outside the housing, which is connected to the battery and configured to absorb solar energy.

8. The device of claim 7, wherein the computing device includes:
at least one memory configured to save instructions for operations of the device;
at least one processor configured to execute the instructions;
a database configured to store information acquired from the thermometer, the GPS, the snow depth measuring unit, and the snow weight measuring unit as meteorological information; and
a communication unit configured to transmit the meteorological information to other computing devices.

9. A device for measuring an amount of snowfall in consideration of a weight of the snowfall, comprising:
a housing;
a snow depth measuring unit configured to measure a depth of the snowfall outside the housing;
a snow holding container configured to hold the snowfall whose depth has been measured by the snow depth measuring unit, wherein at least part of the snow holding container is positioned inside the housing;
a heating unit configured to melt the snowfall held in the snow holding container, wherein the heating unit is formed in or on at least part of the snow holding container; and
a snow weight measuring unit configured to hold meltwater and to measure a weight thereof, wherein the meltwater has been acquired by melting the snowfall with the heating unit;
wherein the device further comprises: at least one snowfall removal plate configured to cover a subarea of an upper surface of the housing and be controlled according to an operation of at least one 3-rd movable column, wherein the subarea of the upper surface corresponds to an area, among an entire area of the upper surface of the housing, on which the snowfall is not held by the snow holding container;
wherein one end of the 3-rd movable column is connected to a power unit and an opposite end of the 3-rd movable column is connected to the snowfall removal plate such that (i) in response to an ascent of the 3-rd movable column, an angle between the snowfall removal plate and the upper surface of the housing becomes same as or larger than a preset removal plate threshold angle, and thus the snowfall accumulated on the snowfall removal plate is removed and (ii) in response to a descent of the 3-rd movable column, the snowfall removal plate covers the upper surface of the housing, and thus protects an interior of the housing.

* * * * *